(12) United States Patent
Koshisaka et al.

(10) Patent No.: US 11,044,415 B2
(45) Date of Patent: Jun. 22, 2021

(54) IMAGE PROCESSING DEVICE ADJUSTING PIXEL-LUMINANCE CHARACTERISTICS

(71) Applicant: DENSO CORPORATION, Kariya (JP)

(72) Inventors: Yuzuru Koshisaka, Kariya (JP); Kazuyoshi Akiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 555 days.

(21) Appl. No.: 15/808,334

(22) Filed: Nov. 9, 2017

(65) Prior Publication Data

US 2018/0139372 A1    May 17, 2018

(30) Foreign Application Priority Data

Nov. 11, 2016  (JP) .............................. JP2016-220712

(51) Int. Cl.
  *H04N 5/235*   (2006.01)
  *H04N 5/355*   (2011.01)
  *H04N 5/225*   (2006.01)

(52) U.S. Cl.
  CPC ......... *H04N 5/2355* (2013.01); *H04N 5/2256* (2013.01); *H04N 5/2351* (2013.01); *H04N 5/35563* (2013.01); *B60Y 2400/3015* (2013.01)

(58) Field of Classification Search
  CPC .. H04N 5/2355; H04N 5/2256; H04N 5/2351; H04N 5/35563
  USPC .......................................................... 348/148
  See application file for complete search history.

(56) References Cited

U.S. PATENT DOCUMENTS 8,120,652 B2 * 2/2012 Bechtel ................ B60Q 1/1423
                                                          348/113

FOREIGN PATENT DOCUMENTS

| JP | 2002-099908 | A |   | 4/2002  |
|----|-------------|---|---|---------|
| JP | 2010-111261 | A |   | 5/2010  |
| JP | 2013-237280 | A |   | 11/2013 |
| JP | 2015-032107 | A |   | 2/2015  |
| JP | 2016-052133 | A |   | 4/2016  |
| JP | 2016052133  | A | * | 4/2016  |

* cited by examiner

*Primary Examiner* — Sath V Perungavoor
*Assistant Examiner* — Kristin Dobbs
(74) *Attorney, Agent, or Firm* — Maschoff Brennan

(57) ABSTRACT

An image processing device is provided with an image acquiring unit that acquires the image from an imaging unit mounted on a vehicle, a light determining unit that determines a state of a light mounted on the vehicle, and an adjusting unit that adjusts a relationship between a luminance at an object to be captured by the imaging unit, and a pixel value in the image. The adjusting unit is configured to set, when the light determining unit determines the state of the light is in the low-beam state, the illuminance where the pixel value is at the lower limit, to be lower than that of a case when the light determining unit determines the state of the light is in the high-beam state.

6 Claims, 6 Drawing Sheets

IMAGE PROCESSING DEVICE ADJUSTING PIXEL-LUMINANCE CHARACTERISTICS

CROSS-REFERENCE TO RELATED APPLICATION

This application is based on and claims the benefit of priority from earlier Japanese Patent Application No. 2016-220712 filed Nov. 11, 2016, the description of which is incorporated herein by reference.

BACKGROUND

Technical Field

The present disclosure relates to image processing devices. More particularly, the present disclosure relates to an image processing device adjusting pixel-luminance characteristics.

Description of the Related Art

Conventionally, a driving support technique using an on-vehicle camera is known. Specifically, the on-vehicle camera acquires images of the surrounding of the vehicle, and objects such as a traffic lane lines are recognized in the recognized images, thereby performing the driving support based on the recognized objects.

Depending on the running environment, objects may not be recognized from the acquired images. In this respect, JP-A-2016-52133 discloses a technique in which imaging condition of the camera is changed depending on the running environment of vehicle.

When the head lamp of the vehicle is set to low beam, the luminance of objects existing in the distance or side of the vehicle is low, because the objects are not lit by the head lamp. Hence, in an image acquired by the camera, since the pixel value is low in a region where these objects are present, it is difficult to recognize the objects.

SUMMARY

The present disclosure provides an image processing device capable of suppressing lower pixel values in regions where objects exist in an image acquired even when the head lamp is in a low beam state.

An image processing device according to the present disclosure is provided with an image acquiring unit that acquires the image from an imaging unit mounted on a vehicle, a light determining unit that determines a state of a light mounted on the vehicle, and an adjusting unit that adjusts a relationship between a luminance at an object to be captured by the imaging unit, and a pixel value in the image.

The adjusting unit is configured to set, when the light determining unit determines the state of the light is in the low-beam state, the illuminance where the pixel value is at the lower limit, to be lower than that of a case when the light determining unit determines the state of the light is in the high-beam state.

According to the image processing device of the present disclosure, in an image acquired under a low-beam state of the light, the pixel value of the object existing in a region where light is not irradiated, is likely to be lowered. Hence, the object in the image can readily be recognized.

It should be noted that the bracketed reference signs in this column and in the claims indicate correspondence to specific means in the embodiments described later, and do not limit the technical scope of the present disclosure.

With reference to the drawings, embodiments of the present disclosure will be described.

FIRST EMBODIMENT

1. Configuration of an Image Processing Device 1

A configuration of an image processing device 1 will be described. The image processing device 1 is mounted on a vehicle as an on-vehicle apparatus. In the following description, a vehicle on which the image processing device is mounted is referred to as an own vehicle. The image processing device 1 is mainly configured of a known microcomputer including CPU 3, and semiconductor memory (hereinafter referred to as memory 5) such as RAM, ROM and flash memory.

The CPU 3 executes a program stored in a non-transitory substantial recording media, whereby various functions of the image processing device 1 are accomplished. In this example, the memory 5 corresponds to the non-transitory substantial recording media. Further, the program is executed, thereby executing a method corresponding to the program. The microcomputers which configure the image processing device 1 may be configured by one or more units.

Figure 1:
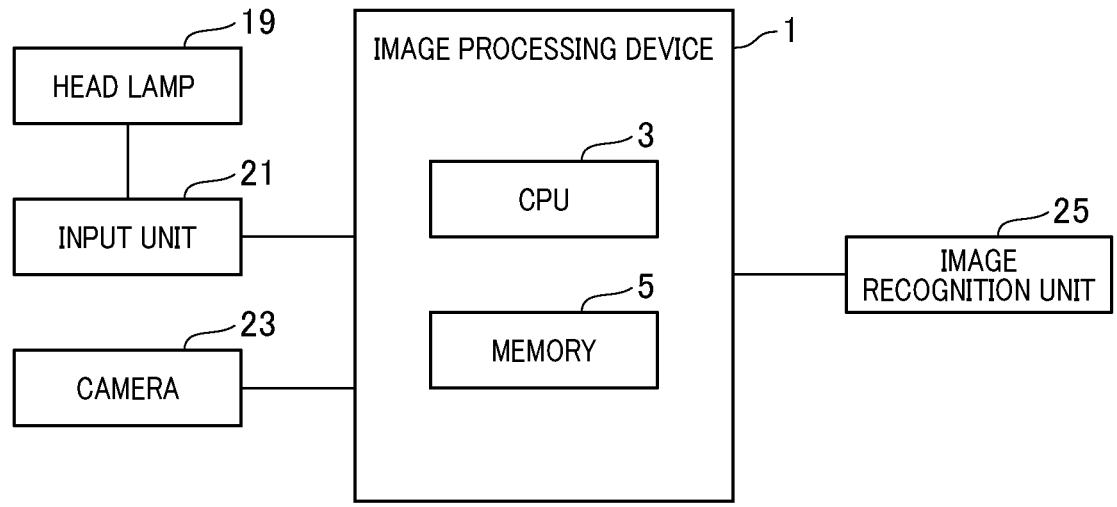
FIG. 1 is a block diagram showing a configuration of an image processing device 1 according to embodiments of the present disclosure.
Figure 2:
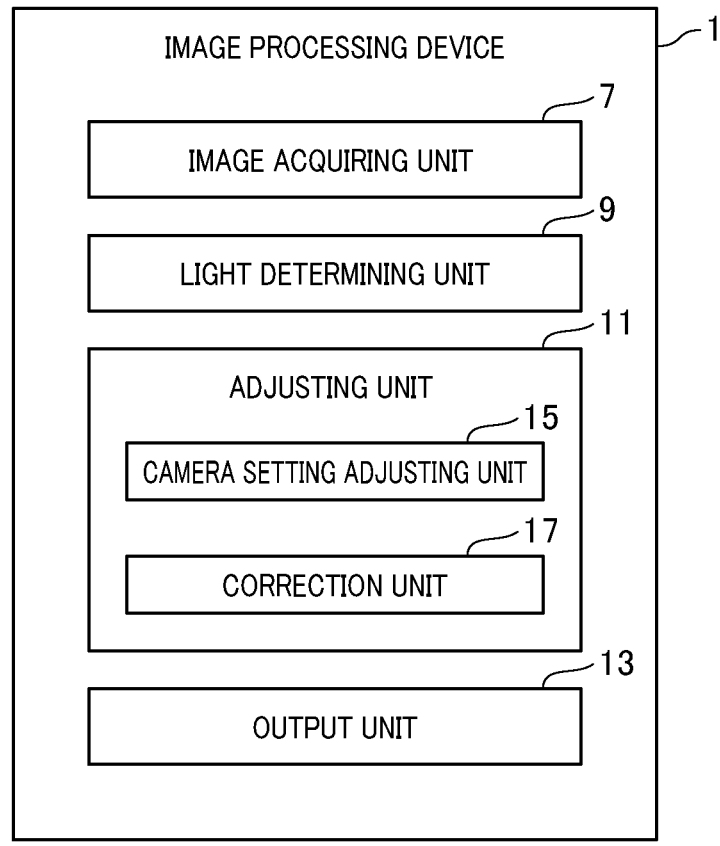
FIG. 2 is a block diagram showing a functional configuration of the image processing device 1 according to the embodiments.

As shown in FIG. 2, the image processing device 1 is provided with an image acquiring unit 7, a light determination unit 9, an adjusting unit 11 and an output unit 13, as functions accomplished by executing the program by the CPU 3. The adjusting unit 11 is provided with a camera setting adjusting unit 15, and a correction unit 17. The methods that achieve these elements constituting the image processing device 1 are not limited to software, and a part of the elements or entire elements may be accomplished by one or more hardware units. For example, in the case where the above-mentioned functions are accomplished by electronic circuits as hardware units, these electronic circuits may be accomplished by digital circuit including number of logic circuits, or analog circuits, or a combination thereof.

The own vehicle is provided with a head lamp 19, an input unit 21, a camera 23, and an image recognition unit 25. The head lamp 19 irradiates an area ahead of the own vehicle. The head lamp 19 can be switched between ON and OFF. Also, the head lamp 19 can be switched between low-beam and high-beam. The head lamp 19 corresponds to light.

The input unit 21 is provided in the vehicle-cabin of the own vehicle. The input unit 21 accepts input of the user. The contents of the user input include commands corresponding to ON, OFF, low-beam and high-beam operations. The head lamp 19 operates in accordance with the contents of the user input of the input unit 21. The input unit 21 corresponds to the input unit.

The camera 23 is mounted on the own vehicle. The camera 23 captures an area ahead of the own vehicle to generate an image. The camera 23 transmits the generated image to the image processing device 1. An area to which the light from the head lamp 19 irradiates is included in entire or part of image capturing area of the camera 23. In the camera 23, pixel-luminance characteristics which will be described later is set based on a signal from the image processing device 1. The camera 23 corresponds to imaging unit.

The image recognition unit 25 acquires an image outputted by the image processing device 1. The image recognition unit 25 recognizes objects in the acquired image, thereby performing driving assist operation using the recognition result. The objects include, for example, other vehicles, pedestrians, lane boundary lines, traffic signs or the like. The driving support functions include, for example, a collision avoidance support brake, a lane keeping assist and a road sign assist.

2. Processing Executed by the Imaging Processing Device 1

Figure 3:
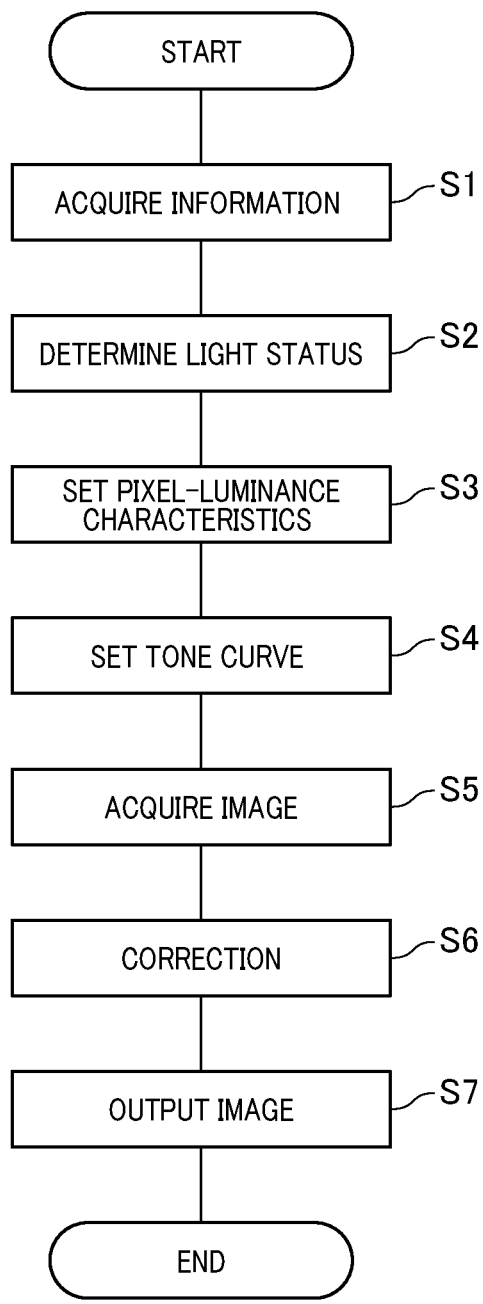
FIG. 3 is a flowchart showing a process executed by the image processing device 1 according to the embodiments.

The processing repeatedly executed at predetermined period by the image processing device 1 will be described with reference to FIGS. 1 to 7. As shown in FIG. 3, at step 1, the light determination unit 9 acquires light information from the input unit 21. The light information includes information showing whether the head lamp 19 is ON or OFF. Also, the light information includes information whether the head lamp 19 operates as low-beam or high-beam.

At step 2, the light determination unit 9 determines a state of the head lamp 19 on the basis of the light information acquired at the step 1. The state of the head lamp 19 includes a state where the head lamp 19 is ON, operating as low-beam (hereinafter referred to as low-beam state), a state where the head lamp 19 is ON, operating as high-beam (hereinafter referred to as high-beam state), and a state where the head lamp 19 is OFF (hereinafter referred to as OFF state).

In the low-beam state, among images 27 acquired from the camera 23, a region where the head lamp 19 irradiates light (hereinafter referred to as light irradiation region 29) is limited to a lower region shown in FIG. 4. As shown in FIG. 5, in the high-beam state, compared to the low-beam state, the light irradiation region 29 spreads towards the upper side and both of left and right sides. In the OFF state, usually, natural light or illumination light irradiates the entire image 27.

Referring back to FIG. 3, at step 3, the camera setting adjusting unit 15 sets, based on the state of the head lamp 19 determined at step 2, the pixel-luminance characteristics of the camera 23. The pixel-luminance characteristics determine a relationship between a luminance at an object to be captured by the camera 23, and the pixel value in the image. Once the pixel-luminance characteristics are determined, the imaging sensitivity and the dynamic range of the camera 23 are uniquely and unambiguously determined. Accordingly, setting the pixel-luminance characteristics corresponds to setting the imaging sensitivity and the dynamic range of the camera 23. Also, setting the pixel-luminance characteristics corresponds to an adjustment of the relationship between the luminance and the pixel value.

Figure 6:
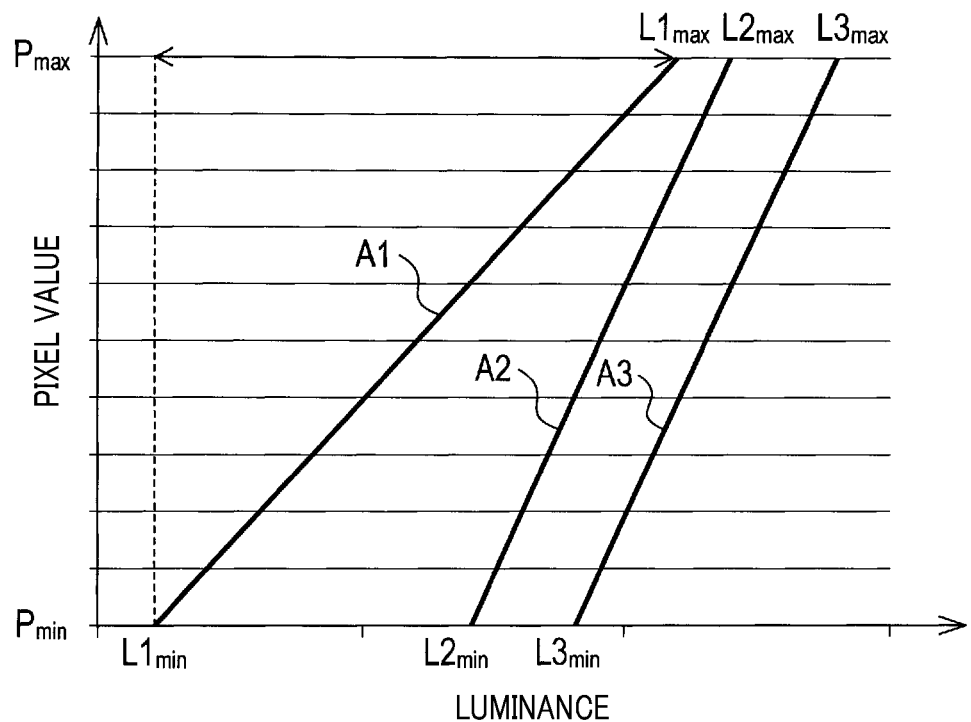
FIG. 6 is a graph showing pixel-luminance characteristics A1 to A3 according to the embodiments.
Figure 7:
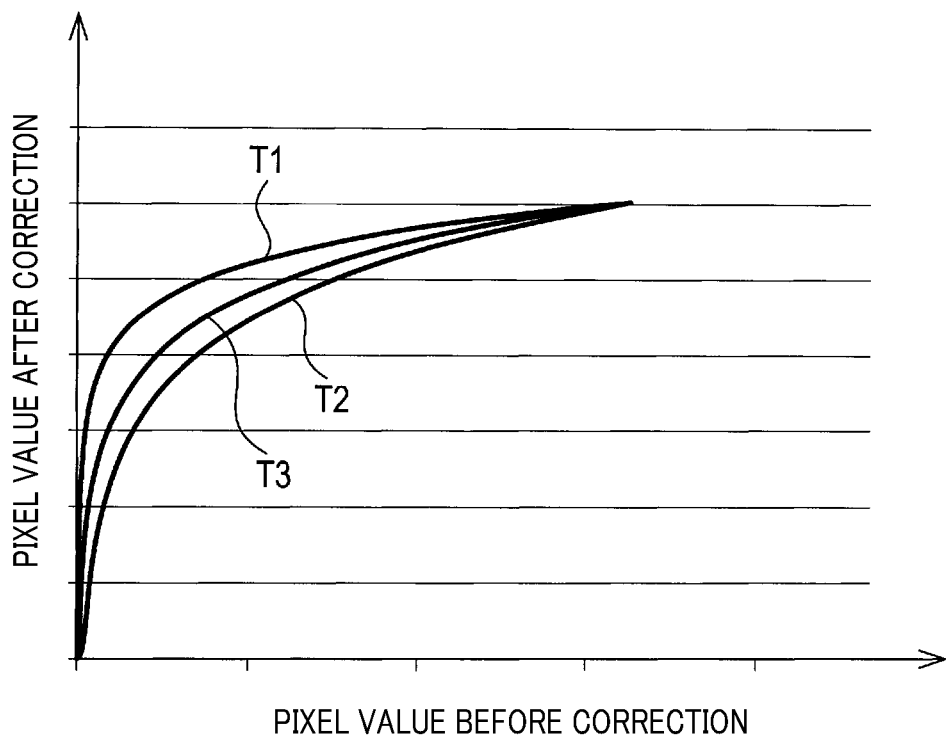
FIG. 7 is a graph showing tone curves T1 to T3 according to the embodiments.

The camera setting adjusting unit 15 sets the pixel-luminance characteristics A1 shown in FIG. 6, when the head lamp 19 is in the low-beam state, and sets the pixel-luminance characteristics A2 shown in FIG. 6, when the head lamp 19 is in the high-beam state. Also, when the head lamp 19 is in the OFF state, the camera setting adjusting unit 15 sets the pixel-luminance characteristics A3 shown in FIG. 6.

The pixel-luminance characteristics A1 has higher imaging sensitivity than that of the pixel-luminance characteristics A2 and A3. A luminance $L1_{min}$ where the pixel value is at the lower limit value $P_{min}$ in the pixel-luminance characteristics A1 is lower than an luminance $L2_{min}$ where the pixel value is at the lower limit value $P_{min}$ in the pixel-luminance characteristics A2. The lower limit value $P_{min}$ is defined as a minimum value of the pixel value in the image.

The dynamic range of the pixel-luminance characteristics A1 is determined by the luminance $L1_{min}$ and the luminance $L1_{max}$. The luminance $L1_{max}$ is defined as a value where the pixel value is the upper limit value $P_{max}$. The upper limit value $P_{max}$ is defined as a maximum pixel value in the image. The dynamic range in the pixel-luminance characteristics A2 is determined by the luminance $L2_{min}$ and the luminance $L2_{max}$. The luminance $L2_{max}$ is defined as an luminance value where the pixel value is the upper limit value $P_{max}$ in the pixel-luminance characteristics A2. The dynamic range in the pixel-luminance characteristics A1 is larger than the dynamic range of the pixel-luminance characteristics A2 and A3

Referring back to FIG. 3, at step 4, the correction unit 17 sets tone curves. The tone curves are used in a correction at step 6 which will be described later. The correction unit 17 sets the tone curve T1 shown in FIG. 7 when operating in the low-beam state, and sets the tone curve T2 when operating in the high-beam state shown in FIG. 7. Also, when in the OFF state, the correction unit 17 sets the tone curve T3 shown in FIG. 7. For the tone curve T1, the pixel value after the correction is set to be higher than that of the tone curves T2 and T3. For the tone curve T2 the pixel value after the correction is set to be lower than that of the tone curves T1 and T3.

Referring back to FIG. 3, at step 5, the image acquiring unit 7 acquires images from the camera 23. These images are captured with the pixel-luminance characteristics which are set at step 3.

At step S6, the correction unit 17 corrects the image acquired at step 5 by using the tone curve set in step 4. This correction is performed in the following manner. That is, the process acquires the pixel value corresponding to each pixel in the image acquired at step 5, and sets the pixel value to be a pre-correction pixel value. Then, the pre-correction pixel value is corrected to obtain a post-correction pixel value using a tone curve shown in FIG. 7 which has been set in step 4. As a result, the post-correction pixel value is used as a pixel value of the pixel.

At step 7, the output unit 13 outputs the corrected image which is corrected at step 6 to the image recognition unit 25.

3. Advantages Obtained from the Image Processing Device 1

(1A) When operating in the low-beam state, the luminance of the object 31 existing in a region other than the light irradiation region 29 is low. The image processing device 1 sets the pixel-luminance characteristics A1 when operating in the low-beam state. In the pixel-luminance characteristics A1, the luminance $L1_{min}$ is lower than the luminance $L2_{min}$. Hence, in the image 27 which is acquired in the low-beam state, the pixel value of the object 31 becomes high. As a result, the object 31 can readily be recognized.

Figure 4:
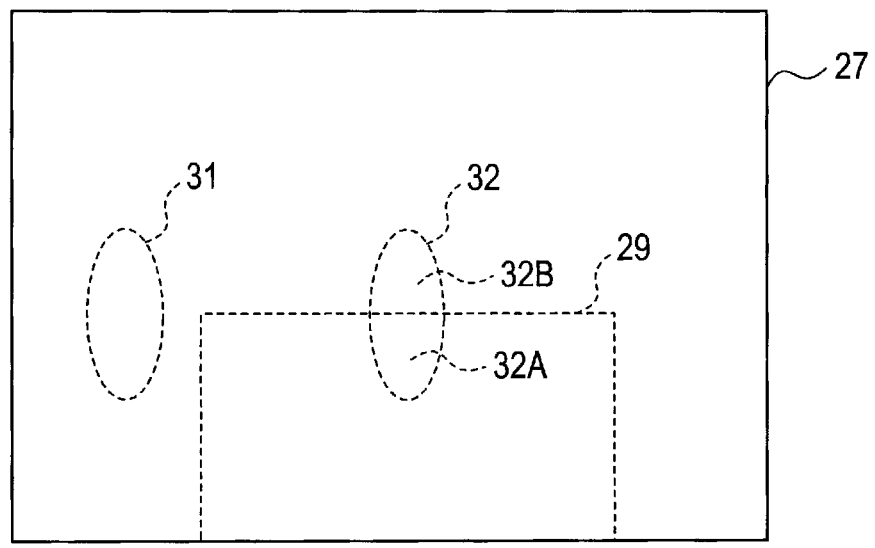
FIG. 4 is an explanatory diagram showing a light irradiation region 29 with a low beam state according to the embodiments.
Figure 5:
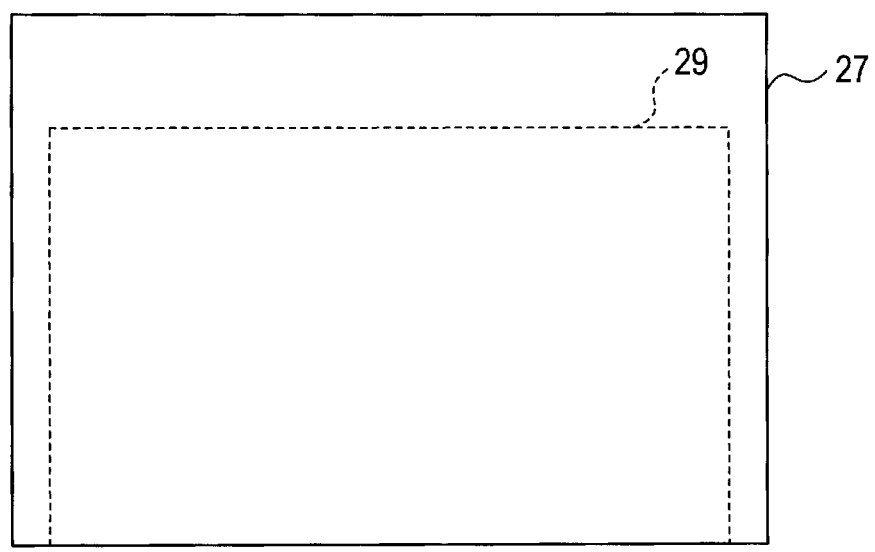
FIG. 5 is an explanatory diagram showing a light irradiation region 29 with a high beam state according to the embodiments.

For the object 32 shown in FIG. 4, the lower portion 32A of the object 32 is in the light irradiation region 29, and the upper portion 32B of the object 32 is in a region other than the light irradiation region 29. The lower portion 32A where light is irradiated has higher luminance and the upper portion 32B where light is no irradiated has lower luminance. The image processing device 1 sets the pixel-luminance characteristics A1 when operating in the low-beam state. The dynamic range of the pixel-luminance characteristics A1 is larger than the dynamic range of the pixel-luminance characteristics A2. As a result, in the image 27 which is acquired in the low-beam state, the object 32 can readily be recognized.

(1B) When setting the pixel-luminance characteristics A1, the imaging sensitivity and the dynamic range are uniquely and unambiguously determined. Hence, by setting the imaging sensitivity and the dynamic range, the luminance $L_{min}$ is adjusted as described in the above (1A). Hence, the luminance $L1_{min}$ can readily be adjusted.

(1C) The image processing device 1 sets the tone curve T1 when operating in the low-beam state, and corrects the pixel value by using the tone curve T1. For the tone curve T1, the pixel value after the correction is set to be higher than that of the tone curves T2 and T3. Therefore, the pixel value of the object 31 in the image 27 acquired in the low-beam state, can be higher. As a result, contrast can be enhanced for the object 31 existing in a region other than the light irradiation region 29 and having low luminance.

(1D) The image processing device 1 sets the pixel-luminance characteristics A2 when operating in the high-beam state and sets the tone curve T2. The imaging sensitivity of the pixel-luminance characteristics A2 is lower than that of the pixel-luminance characteristics A1. The tone curve T2 produces lower pixel values after the correction than that of the tone curves T1 and T3. Hence, in the high-beam state, the pixel value of an object is unlikely to be excessively high, when operating in the high-beam state. Accordingly, an object can readily be recognized.

(1E) The image processing device 1 determines a state of the head lamp 19 in accordance with the input result of the input unit 21. Therefore, the state of the head light 19 can be more accurately determined.

SECOND EMBODIMENT

1. Difference from the First Embodiment

Figure 8:
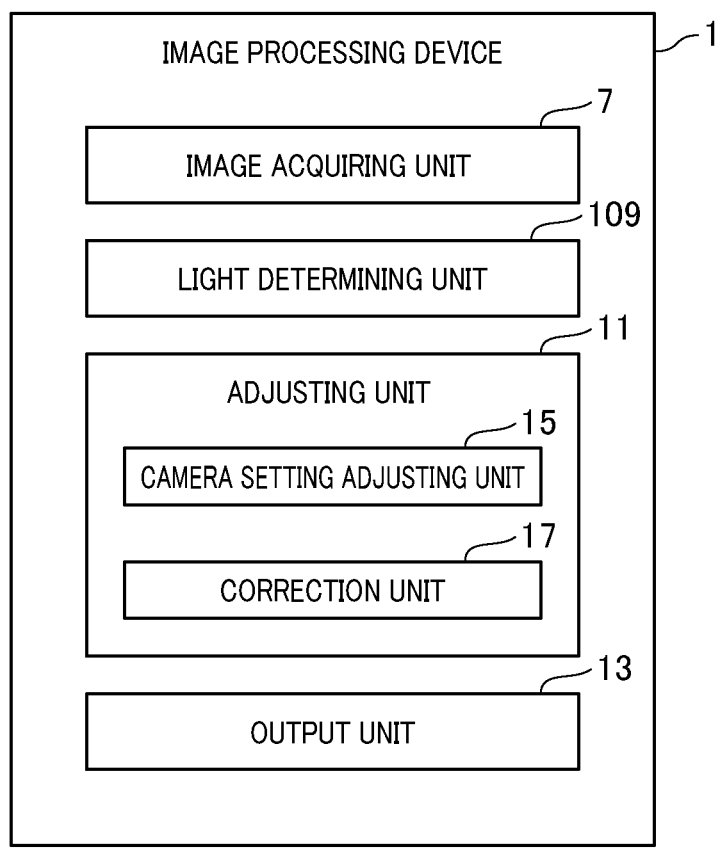
FIG. 8 is a block diagram showing a functional diagram of the image processing device 1 according to the embodiments.

The second embodiment is similar to the first embodiment in the fundamental configuration. Hence, only portions which are different from the first embodiment will be described. The same reference signs as the first embodiment indicate the same configuration, and explanation thereof will be referred to the preceding description. In the above-described first embodiment, the light determination unit 9 is provided. According to the second embodiment, as shown in FIG. 8, a light determination unit 109 is provided.

2. Process Executed by the Image Processing Device 1

Figure 9:
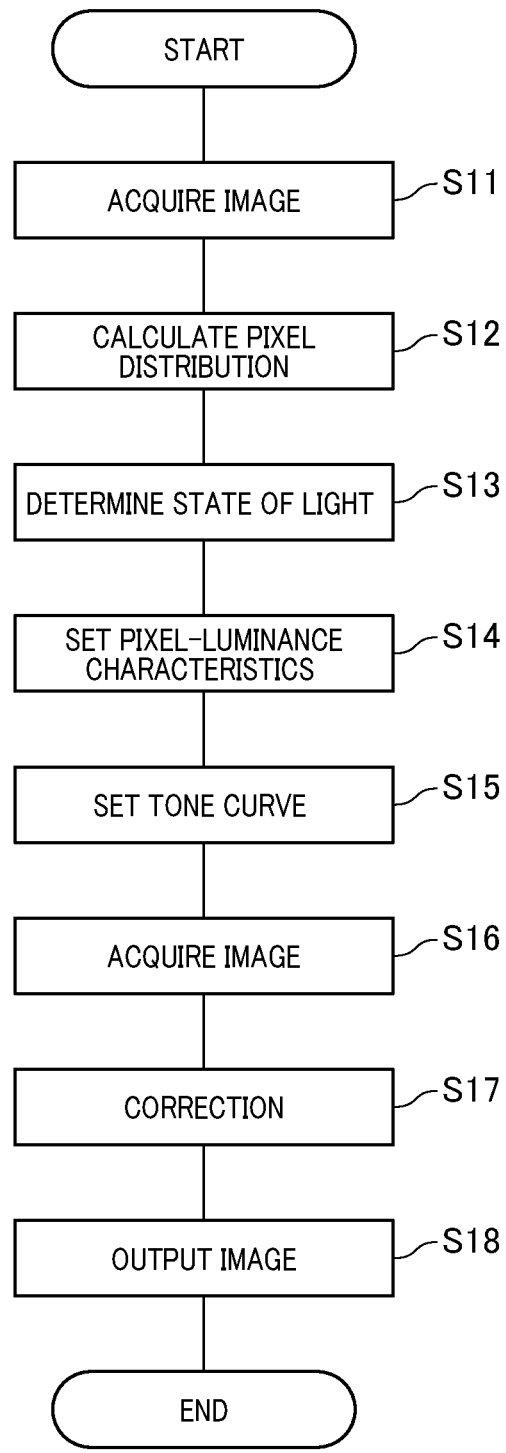
FIG. 9 is a flowchart showing a process executed by the image processing device 1 according to the embodiments.

The process executed by the image processing device 1 will be described with reference to FIG. 9. The process is repeatedly executed at every predetermined period. In step 11 shown in FIG. 9, the image acquiring unit 7 acquires an image from the camera 23. The imaging sensitivity and the dynamic range at step 11 in the initial process are defined as default values. In the process at step 11 after the second time, the imaging sensitivity and the dynamic range when the camera 23 acquires the image, are set at step 14 (described later) in the previous process.

At step 12, the light determination unit 109 calculates a distribution of pixel value in the image acquired at the step 11. The distribution of pixel value means a distribution of pixel values (pixel distribution) corresponding to respective pixels which constitute the image.

At step 13, the light determination unit 109 determines the state of the head lamp 19, based on the pixel distribution calculated at step 12. The determination is performed as follows.

The light determination unit 109 stores distribution patterns in advance. The distribution patterns include a pixel distribution pattern in the low beam state, a pixel distribution pattern in the high beam state, and a pixel distribution pattern in the OFF state. In the pixel distribution pattern in the low-beam state, the pixel values are high in the light irradiation region 29 shown in FIG. 4, and the pixel values are low in other regions. In the pixel distribution pattern in the high-beam state, the pixel values are high in the light irradiation region 29 shown in FIG. 5, and the pixel values are low in other regions. The pixel distribution pattern in the OFF state shows small variation of the pixel values in the whole image.

The light determination unit 109 determines which pattern is the most similar to the pixel distribution calculated by step 12. In the case where the pixel distribution calculated by step 12 is the most similar to the pattern in the low-beam state, the process determines that the head lamp 19 is in the low-beam state. In the case where the pixel distribution calculated by step 12 is the most similar to the pattern in the high-beam state, the process determines that the head lamp 19 is in the high-beam state. Further, in the case where the pixel distribution calculated by step 12 is the most similar to the pattern in the OFF state, the process determines that the head lamp 19 is in the OFF state.

At step 14, the camera setting adjusting unit 15 sets the pixel-luminance characteristics based on the state of the head lamp 19 determined by step 13. The camera setting adjusting unit 15 sets the pixel-luminance characteristics A1 when operating in the low-beam state, sets the pixel-luminance characteristics A2 when operating in the high-beam state, and sets the pixel-luminance characteristics A3 when it is in the OFF state.

At step 15, the correction unit 17 sets the tone curve. The correction unit 17 sets the tone curve T1 when operating in the low-beam state, sets the tone curve T2 when operating in the high-beam state, and sets the tone curve T2 when it is in the OFF state.

At step 16, the image acquiring unit 7 acquires image from the camera 23. The image is captured with the pixel-luminance characteristics set in step 14. At step 17, the correction unit 17 corrects the image acquired at step 16 with the tone curve set in step 15.

At step 18, the output unit 13 outputs the image corrected at step 17 to the image recognition unit 25.

3. Effects Obtained from the Image Processing Device 1

According to the second embodiment, the above-described effects of (1A) to (1D) according to the first embodiment can be obtained. Further, the following effect (2A) can be obtained.

(2A) The image processing device 1 determines the state of the head lamp 19 based on the pixel distribution. Hence, only simple configuration is required so that the state of the head lamp 19 can be determined simply.

OTHER EMBODIMENT

Embodiments of the present disclosure are described in the above. The present disclosure is not limited to the above-described embodiments, and various modifications can be made.

(1) Dynamic range of the pixel-luminance characteristics A1 and dynamic range of the pixel-luminance A2 may be the same.

(2) In the first and second embodiments, the tone curves T1 and T2 may be the same. Also, in the first and second embodiment, the tone curves may not be used for the correction.

(3) In the first and second embodiments, the pixel-luminance characteristics A1 and the pixel-luminance characteristics A2 may be the same.

(4) The head lamp 19 may be operated by an automatic control. For example, the head lamp 19 may light when the surrounding of the own vehicle becomes dark. Moreover, the head lamp 19 may recognize a light of the preceding vehicle or the on-coming vehicle so as to change the state between the high-beam state and the low beam state.

In the above cases, the image processing device 1 can acquire the light information indicating the state of the head lamp 19 from a control device of the head lamp 19. The light information includes information whether the head lamp 19 is ON or OFF, and information whether state of the head lamp is low-beam or high beam. The image processing device 1 can perform similar processes of the first and second embodiments by using the light information.

(5) A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by the scope of claims are defined as embodiments of the present disclosure.

(6) Other than the above-described image processing device, the present disclosure can be embodied in various modes such as a system having the image processing device as an element thereof, a program allowing a computer to serve as the image processing device, a non-transitory tangible recording media such as a semiconductor memory which stores the program, an image processing method, and a driving assistance method.

What is claimed is:

1. An image processing device comprising:
an image acquiring unit that acquires an image from an imaging unit mounted on a vehicle;
a light determining unit that determines a state of a light mounted on the vehicle, the state of the light including a low-beam state and a high-beam state; and
an adjusting unit that adjusts a pixel-luminance characteristic of the imaging unit, the pixel-luminance characteristic defining a relationship between a luminance at an object to be captured by the imaging unit and a pixel value in the image, the pixel value having a range between a lower limit and an upper limit, the pixel-luminance characteristic being set in advance depending on the state of the light determined by the light determining unit,
wherein the adjusting unit is configured to
select the pixel-luminance characteristic based on whether the state of the light is in the low-beam state or the high-beam state; and
adjust the pixel-luminance characteristic of the imaging unit to the selected pixel-luminance characteristic, and
wherein an illuminance for a pixel value at the lower limit of a pixel-luminance characteristic for a state of the light in the low-beam state is lower than an illuminance for a pixel value at the lower limit of a pixel-luminance characteristic for a state of the light in the high-beam state.

2. The image processing device according to claim 1, wherein
the luminance for the pixel value at the lower limit is adjusted by the adjusting unit setting an imaging sensitivity or a dynamic range of the imaging unit.

3. The image processing device according to claim 1, wherein
the adjusting unit includes a correction unit that corrects the pixel value of the image; and
the correction unit sets, when the light determining unit determines the state of the light is in the low-beam state, the pixel value after correction to be higher than that of a case when the light determining unit determines the state of the light is in the high-beam state.

4. The image processing device according to claim 1, wherein
the image processing device includes an input unit that accepts an input indicating the state of the light from a user; and
the light determining unit is configured to determine the state of the light in accordance with the input from the user.

5. The image processing device according to claim 1, wherein
the light determination unit is configured to determine the state of the light based on a pixel distribution of the image.

6. A method for processing an image comprising:
acquiring an image from an imaging unit mounted on a vehicle;
determining a state of a light mounted on the vehicle, the state of the light including a low-beam state and a high-beam state; and
adjusting a pixel-luminance characteristic of the imaging unit, the pixel-luminance characteristic defining a relationship between a luminance at an object to be captured by the imaging unit and a pixel value in the image, the pixel value having a range between a lower limit and an upper limit, the pixel-luminance characteristic being set in advance depending on the state of the light determined by the light determining unit, wherein the pixel-luminance characteristic is selected based on whether the state of the light is in the low-beam state or the high-beam state, and wherein the pixel-luminance characteristic of the imaging unit is adjusted to the selected pixel-luminance characteristic, and wherein an illuminance for a pixel value at the lower limit of a pixel-luminance characteristic for a state of the light in the low-beam state is lower than an illuminance for a pixel value at the lower limit of a pixel-luminance characteristic for a state of the light in the high-beam state.

* * * * *